United States Patent
Mimberg

(10) Patent No.: US 7,479,753 B1
(45) Date of Patent: Jan. 20, 2009

(54) FAN SPEED CONTROLLER

(75) Inventor: Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/786,244

(22) Filed: Feb. 24, 2004

(51) Int. Cl.
*G05B 11/28* (2006.01)

(52) U.S. Cl. .................. 318/599; 318/254.2; 318/268

(58) Field of Classification Search .............. 318/138, 318/254, 439, 700, 800, 801, 471–473, 268, 318/599, 254.2; 388/800–900
See application file for complete search history.

(56) References Cited

U.S. PATENT DOCUMENTS

| | | | | |
|---|---|---|---|---|
| 4,706,180 A | * | 11/1987 | Wills | .................. 363/132 |
| 5,086,501 A | | 2/1992 | DeLuca et al. | |
| 5,177,431 A | | 1/1993 | Smith et al. | |
| 5,218,705 A | | 6/1993 | DeLuca et al. | |
| 5,254,878 A | | 10/1993 | Olsen | |
| 5,307,003 A | | 4/1994 | Fairbanks et al. | |
| 5,350,988 A | * | 9/1994 | Le | .................. 318/618 |
| 5,446,365 A | * | 8/1995 | Nomura et al. | .............. 320/128 |
| 5,502,838 A | | 3/1996 | Kikinis | |
| 5,568,350 A | | 10/1996 | Brown | |
| 5,587,672 A | | 12/1996 | Ranganathan et al. | |
| 5,589,762 A | | 12/1996 | Iannuzo | |
| 5,630,110 A | | 5/1997 | Mote, Jr. | |
| 5,648,766 A | | 7/1997 | Stengel et al. | |
| 5,742,142 A | * | 4/1998 | Witt | .................. 318/599 |
| 5,745,375 A | | 4/1998 | Reinhardt et al. | |
| 5,752,011 A | | 5/1998 | Thomas et al. | |
| 5,757,172 A | | 5/1998 | Hunsdorf et al. | |
| 5,760,636 A | | 6/1998 | Noble et al. | |
| 5,812,860 A | | 9/1998 | Horden et al. | |
| 5,825,972 A | * | 10/1998 | Brown | .................. 388/811 |
| 5,847,552 A | | 12/1998 | Brown | |
| 5,864,225 A | | 1/1999 | Bryson | |
| 5,952,798 A | * | 9/1999 | Jones et al. | .................. 318/268 |
| 6,025,737 A | | 2/2000 | Patel et al. | |
| 6,040,668 A | * | 3/2000 | Huynh et al. | .............. 318/471 |
| 6,047,248 A | | 4/2000 | Georgiou et al. | |
| 6,163,583 A | | 12/2000 | Lin et al. | |
| 6,243,656 B1 | | 6/2001 | Arai et al. | |
| 6,304,824 B1 | | 10/2001 | Bausch et al. | |

(Continued)

FOREIGN PATENT DOCUMENTS

JP       57097397    *   6/1982

OTHER PUBLICATIONS

Laplante, P. (Editor-in-Chief), "Comprehensive Dictionary of Electrical Engineering", CRC Press, IEEE Press, pp. 164-165.*

(Continued)

*Primary Examiner*—Bentsu Ro
*Assistant Examiner*—Thai Dinh

(57) ABSTRACT

Embodiments of the present invention provide a low noise and high efficiency fan speed controller. The fan speed controller generates a pulse width modulation signal. The pulse width modulation signal is utilized to switch mode convert a supply voltage into a linear voltage. The voltage level of the linear voltage is a function of the pulse width modulation signal. The linear voltage is utilized to control the operating speed of a direct current fan.

25 Claims, 6 Drawing Sheets

U.S. PATENT DOCUMENTS

| | | | |
|---|---|---|---|
| 6,310,912 B1* | 10/2001 | Maiocchi et al. | 375/238 |
| 6,363,490 B1 | 3/2002 | Senyk | |
| 6,366,157 B1 | 4/2002 | Abdesselem et al. | |
| 6,369,557 B1 | 4/2002 | Agiman | |
| 6,415,388 B1 | 7/2002 | Browning et al. | |
| 6,425,086 B1 | 7/2002 | Clark et al. | |
| 6,448,815 B1 | 9/2002 | Talbot et al. | |
| 6,456,049 B2 | 9/2002 | Tsuji | |
| 6,470,289 B1 | 10/2002 | Peters et al. | |
| 6,484,041 B1 | 11/2002 | Aho et al. | |
| 6,535,986 B1 | 3/2003 | Rosno et al. | |
| 6,621,242 B2* | 9/2003 | Huang et al. | 318/268 |
| 6,630,754 B1 | 10/2003 | Pippin | |
| 6,650,074 B1* | 11/2003 | Vyssotski et al. | 318/254 |
| 6,650,740 B1* | 11/2003 | Adamczyk et al. | 379/88.22 |
| 6,662,775 B2 | 12/2003 | Hauser | |
| 6,674,587 B2* | 1/2004 | Chhabra et al. | 359/888 |
| 6,703,803 B2* | 3/2004 | Ohiwa et al. | 318/138 |
| 6,714,891 B2 | 3/2004 | Dendinger | |
| 6,718,496 B1 | 4/2004 | Fukuhisa et al. | |
| 6,721,892 B1 | 4/2004 | Osborn et al. | |
| 6,737,860 B2* | 5/2004 | Hsu et al. | 324/161 |
| 6,774,587 B2* | 8/2004 | Makaran et al. | 318/34 |
| 6,794,836 B2* | 9/2004 | Strothmann et al. | 318/268 |
| 6,795,075 B1 | 9/2004 | Streitenberger et al. | |
| 6,795,927 B1 | 9/2004 | Altmejd et al. | |
| 6,801,004 B2* | 10/2004 | Frankel et al. | 318/268 |
| 6,804,131 B2* | 10/2004 | Galbiati et al. | 363/132 |
| 6,806,673 B2* | 10/2004 | Ho | 318/599 |
| 6,815,938 B2 | 11/2004 | Horimoto | |
| 6,831,448 B2 | 12/2004 | Ishii et al. | |
| 6,853,569 B2* | 2/2005 | Cheng et al. | 363/97 |
| 6,885,233 B2 | 4/2005 | Huard et al. | |
| 6,889,331 B2 | 5/2005 | Soerensen et al. | |
| 6,975,087 B1* | 12/2005 | Crabill et al. | 318/590 |
| 6,987,370 B2* | 1/2006 | Chheda et al. | 318/268 |
| 7,045,993 B1* | 5/2006 | Tomiyoshi | 323/224 |
| 7,071,640 B2* | 7/2006 | Kurosawa et al. | 318/400.04 |
| 7,100,061 B2 | 8/2006 | Halepete et al. | |
| 7,119,522 B1* | 10/2006 | Tomiyoshi | 323/224 |
| 7,149,909 B2 | 12/2006 | Cui et al. | |
| 2001/0033504 A1* | 10/2001 | Galbiati et al. | 363/98 |
| 2001/0045779 A1 | 11/2001 | Lee et al. | |
| 2002/0113622 A1 | 8/2002 | Tang | |
| 2003/0110423 A1 | 6/2003 | Helms et al. | |
| 2004/0105237 A1 | 6/2004 | Hoover et al. | |
| 2005/0007047 A1* | 1/2005 | Strothmann et al. | 318/268 |

OTHER PUBLICATIONS

Microchip Technology Inc., "Linear Voltage Fan Speed Control Using Microchip's TC64X Family", pp. 1-4, 2003.*

Calvert, J.B., "The Phase-Locked Loop", Jul. 24, 2001, http://www.du.edu/~etuttle/electron/elect12.htm.

Grishman, Ralph, Lecture Notes, "Computer System Design—Spring 2002", "Lecture 2: Combinational Logic Design", 2002, Department of Computer Science, New York University.

* cited by examiner

FAN SPEED CONTROLLER

BACKGROUND OF THE INVENTION

Referring to FIG. 1A, a block diagram of a fan speed controller for controlling the operating speed of a fan 190, according to the prior art, is shown. The fan 190 is typically utilized to cool electronic devices that include, but are not limited to, computers, game consoles, microprocessors, graphics processor and the like. The cooling circuit includes a pulse width modulation (PWM) generator 110, a drive transistor 145 and a fan 190. The speed of the fan 190 is controlled by a PWM signal ($V_{PWM}$) generated by the PWM generator 110.

An exemplary PWM generator 110 includes a reference voltage generator 115, an operational amplifier 120, a comparator 125 and a signal generator 130. The operational amplifier 120 receives a feedback signal ($V_{FB}$) (e.g., fan speed signal, temperature signal or the like) and the reference voltage ($V_{REF}$) generated by the reference voltage generator 115. The operational amplifier 120 generates a control signal ($V_{CONTROL}$) having a voltage that is a function of the difference between the feedback signal ($V_{FB}$) and the reference voltage ($V_{REF}$). The signal generator 130 generates a signal having a repetitive wave form ($V_{RWF}$) (e.g., sawtooth or the like). The comparator 125 receives the control signal ($V_{CONTROL}$) and the repetitive wave form signal ($V_{RWF}$). As depicted in FIG. 1B, the comparator 125 generates the PWM signal ($V_{PWM}$) (e.g., a periodic rectangular wave) as a function of the relative difference between the control signal ($V_{CONTROL}$) and the repetitive wave form signal ($V_{RWF}$). The output of the comparator 125 is at a first state (e.g., "on") when the repetitive wave form signal ($V_{RWF}$) is less than the control signal ($V_{CONTROL}$). The output of the comparator 125 is at a second state (e.g., "off") when the repetitive wave form signal ($V_{RWF}$) is greater than the control signal ($V_{CONTROL}$). Thus, the duty cycle of the PWM signal ($V_{PWM}$) is a function of the feedback signal ($V_{FB}$).

The switching speed of the PWM signal is typically a few tens of Hertz (Hz), which is in the audible frequency range (e.g., 20-20,000 Hz). The PWM signal ($V_{PWM}$) controls the switching of the drive transistor 145. The drive transistor 145 is on during the duty cycle of the PWM signal ($V_{PWM}$). Accordingly, a drive current flows through the fan 190. The longer the duty cycle in a given period, the longer the fan 190 is driven. The operating speed of the fan 190 increases the longer the fan 190 is driven.

Referring now to FIG. 1C, timing diagrams of exemplary PWM signals ($V_{PWM}$) are shown for controlling fan speed. The PWM signals ($V_{PWM}$) are composed of rectangular pulse trains having a constant period (T). The duration of the duty cycle ($t_{on}$) is varied to control the operating speed of the fan 190. The operating speed of the fan 190 is a function of the duty cycle of the PWM signal ($V_{PWM}$) while the frequency remains constant. For example, the fan 190 is operated at a slow speed by applying a PWM signal ($V_{PWM}$) having a relatively short duty cycle 192. The fan 190 is operated at a fast speed by applying a PWM signal ($V_{PWM}$) having a relatively long duty cycle 196.

Direct PWM fan speed control is advantageous because relatively high efficiencies can be achieved, e.g., energy supplied to the fan divided by the input energy can be 85% or more. However, direct PWM fan speed control is problematic in that the fan 190 may emit audible noise as a result of the time varying drive current through the fan 190.

To avoid the audible noise, direct current (DC) regulation may be utilized to drive the fan. Referring now to FIG. 2A, a block diagram of another fan speed controller 205, according to the prior art, is shown. The linear voltage fan speed controller 205 includes an analog voltage generator 270 and an amplifier 275. The analog generator 270 generates a linear voltage having a varying voltage level. The linear voltage is amplified by an amplifier 275 before driving the fan 290. It is appreciated that the amplifier 275 may be integral to the analog voltage generator 270. As depicted in FIG. 2B, the speed of the fan 290 is a function of the voltage level of the linear voltage generated by an analog voltage generator 270. For example, the fan 290 is operated at a slow speed by applying a linear voltage having a relatively low voltage level 292. The fan 290 is operated at a fast speed by applying a linear voltage having a relatively high voltage level 294.

Driving the fan 290 with a linear voltage reduces the fan noise. However, amplification of the linear voltage results in relatively high losses as compared to direct PWM fan speed controllers. The efficiency of a linear controlled fan is defined as output voltage over input voltage ($V_{IN}/V_{OUT}$). Thus, the slower the fan (e.g., lower output voltage) the lower the efficiency, because the input voltage is constant. Usual regulation ranges can result in efficiencies of about 50% to 75%.

Referring now to FIG. 3, a block diagram of another fan speed controller 305, according to the prior art, is shown. The fan speed controller 305 includes a PWM generator 310, a low pass filter (e.g., resistor-capacitor (RC) circuit) 320 and an amplifier 330. The speed of the fan 340 is controlled by low pass filtering a PWM signal to generate a linear voltage. The voltage level of the linear signal is a function of the duty cycle of the PWM signal. For example a relatively low voltage level is generated by RC low pass filtering a PWM signal having a relatively short duty cycle. A relatively high voltage level is generated by RC low pass filtering a PWM signal having a relatively long duty cycle.

Driving the fan 390 with a linear voltage reduces the fan noise. However, amplification of the linear voltage results in relatively high losses as compared to direct PWM fan speed controllers. The efficiency of a linear controlled fan is defined as output voltage over input voltage ($V_{IN}/V_{OUT}$). Thus, the slower the fan 340 (e.g., lower output voltage) the lower the efficiency, because the input voltage is constant. Usual regulation ranges can result in efficiencies of about 50% to 75%.

SUMMARY OF THE INVENTION

Embodiments of the present invention are directed toward a fan speed controller. The fan speed controller generates a pulse width modulation signal. The pulse width modulation signal is utilized to switch mode convert a supply voltage into a linear voltage. The voltage level of the linear voltage is a function of the duty cycle of the pulse width modulation signal. The linear voltage is utilized to control the operating speed of a direct current fan.

In one embodiment of the present invention, the fan speed controller includes a pulse width modulation generator and a drive stage. The drive stage includes a transistor, a diode, a capacitor and an inductor. The gate of the transistor receives the pulse width modulation signal generated by the pulse width modulation generator. The source of the transistor is electrically coupled to ground and the drain of the transistor is electrically coupled to the anode of the diode. The cathode of the diode is electrically coupled to a supply potential and a first terminal of the capacitor. The second terminal of the capacitor is electrically coupled to the first terminal of the inductor. The second terminal of the inductor is electrically coupled to the anode of the diode and the drain of the transistor. The linear voltage is generated across the capacitor.

In another embodiment of the present invention, the drive stage includes a first transistor, a second transistor, a capacitor and an inductor. The gate of the first transistor receives the pulse width modulation signal generated by the pulse width modulation generator. The gate of the second transistor receives a compliment of the pulse width modulation signal. The source of the first transistor is electrically coupled to ground and the drain of the first transistor is electrically coupled to the source of the second transistor. The drain of the second transistor is electrically coupled to a supply potential and a first terminal of the capacitor. The second terminal of the capacitor is electrically coupled to the first terminal of the inductor. The second terminal of the inductor is electrically coupled to the source of the second transistor and the drain of the first transistor. The linear voltage is generated across the capacitor.

Accordingly, embodiments of the present invention reduce switching noise as compared to conventional PWM based fan speed controllers. The fan speed controller, in accordance with embodiments of the present invention, readily provides efficiencies (e.g., input power divided by power delivered to the fan) of 80-90%. The fan speed controller, in accordance with embodiments of the present invention, may be utilized to control the operating speed of electronic device cooling fans for instance. Exemplary electronic devices include, but are not limited to, computers, servers, game consoles, microprocessors, graphics processors and the like.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1A:
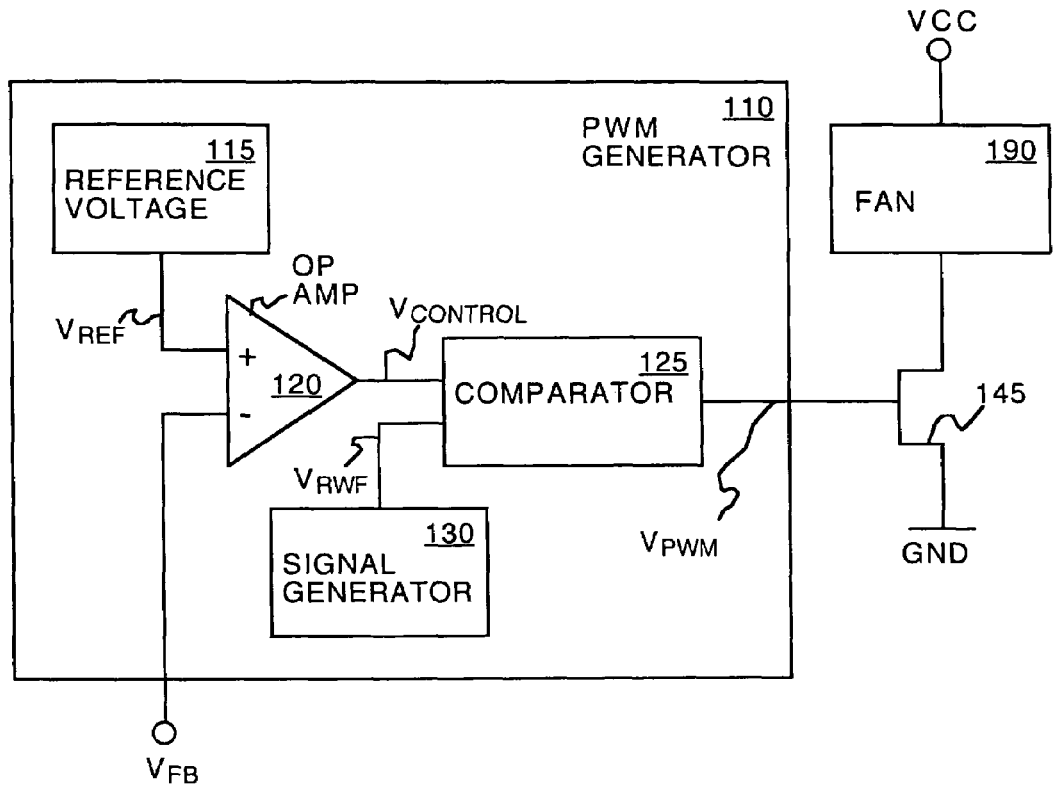
FIG. 1A shows a block diagram of a fan speed controller for controlling the operating speed of a fan, according to the conventional art.
Figure 1B:
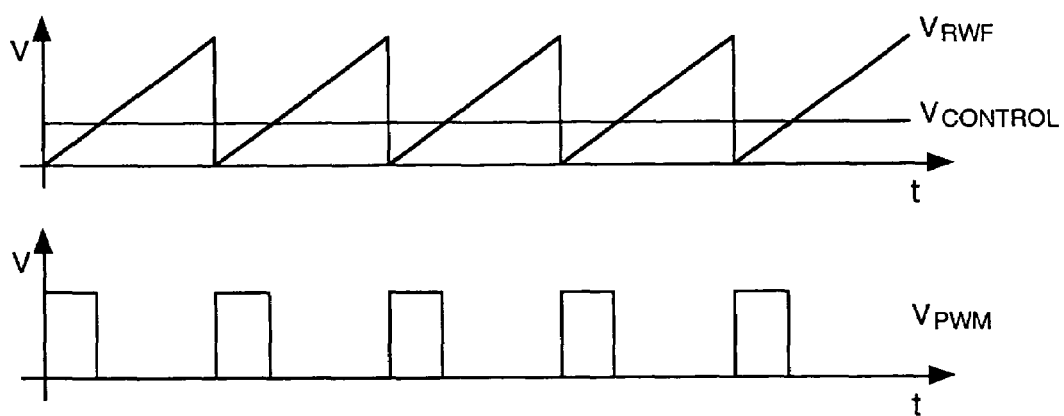
FIG. 1B shows a timing diagram illustrating generation of a pulse width modulation signal, according to the convention art.
Figure 1C:
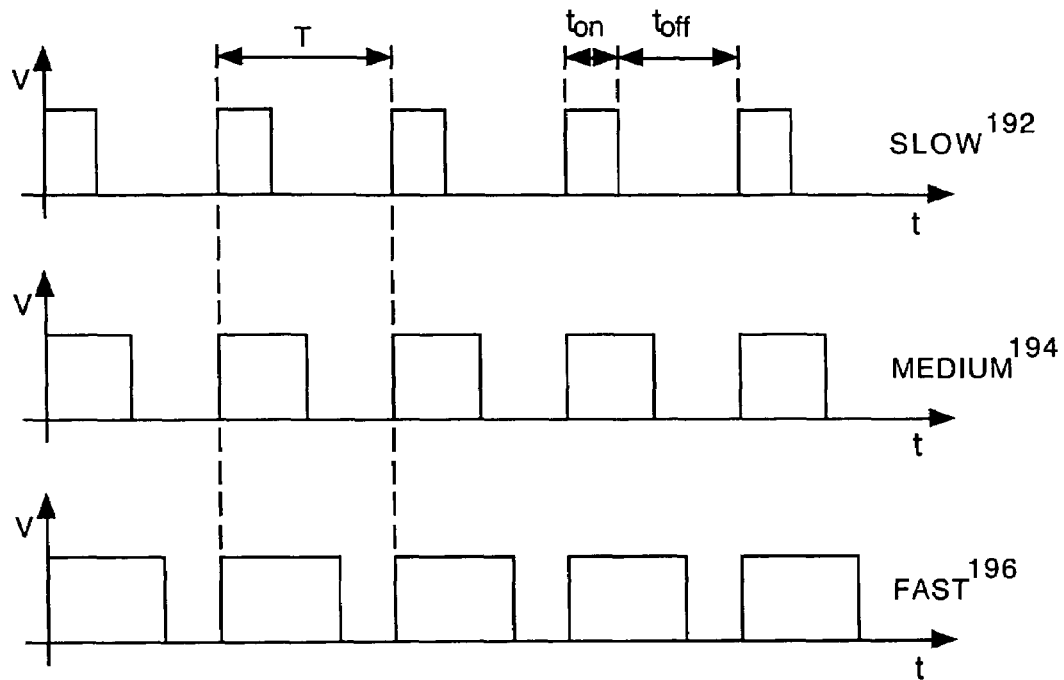
FIG. 1C shows timing diagrams of exemplary PWM signals, according to the conventional art.
Figure 2A:
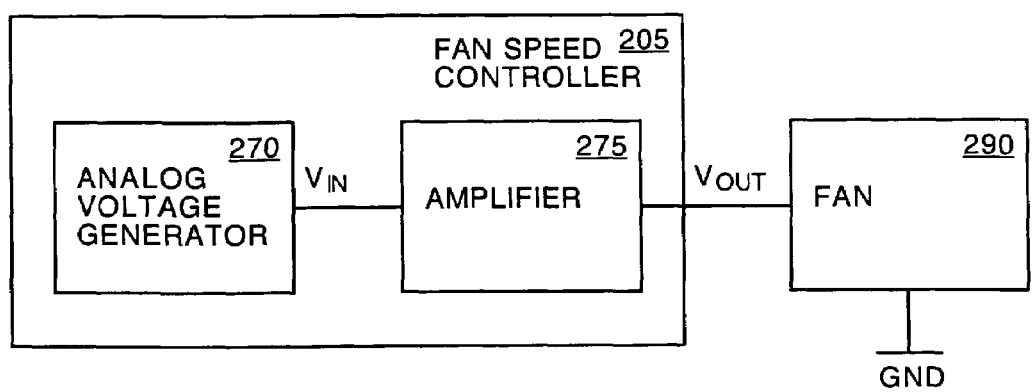
FIG. 2A shows a block diagram of another fan speed controller, according to the conventional art.
Figure 2B:
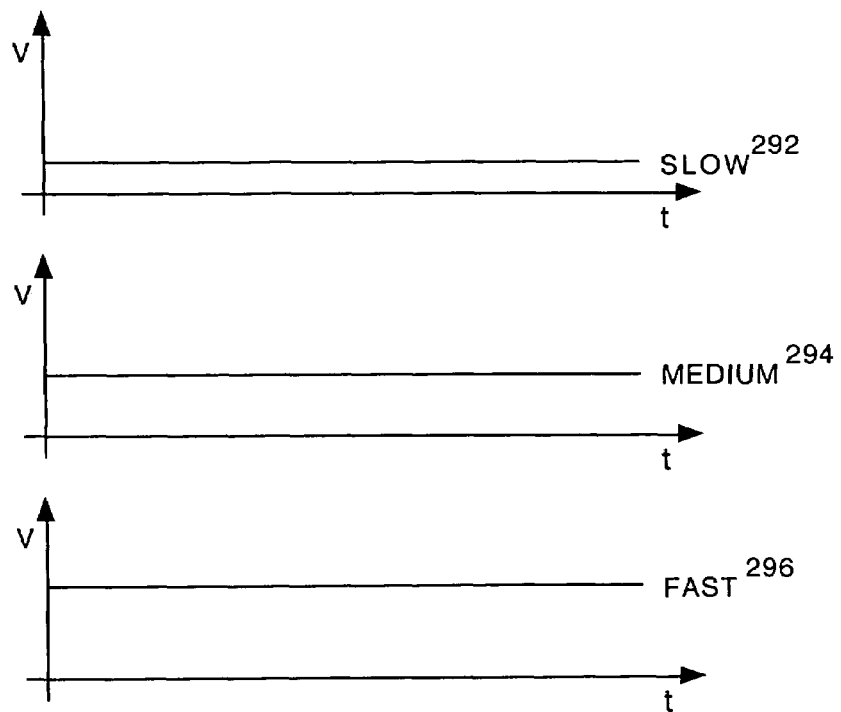
FIG. 2B shows timing diagrams of exemplary linear voltage signals, according to the conventional art.
Figure 3:
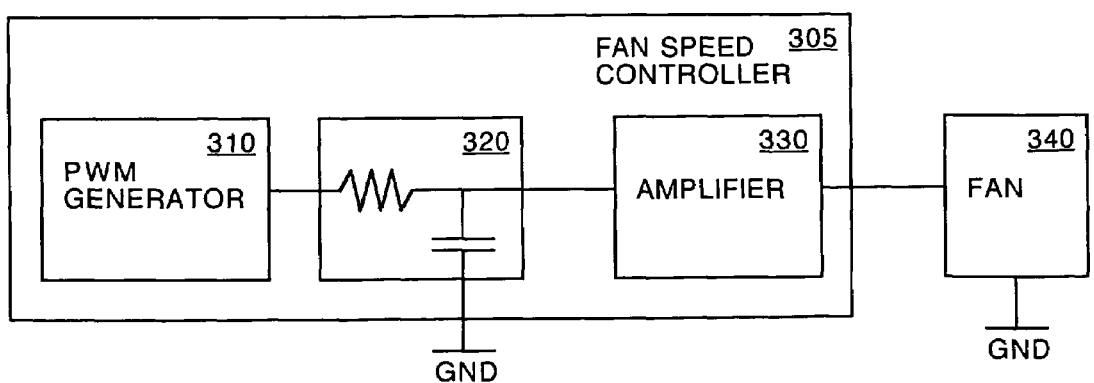
FIG. 3 shows a block diagram of another fan speed controller, according to the conventional art.
Figure 4A:
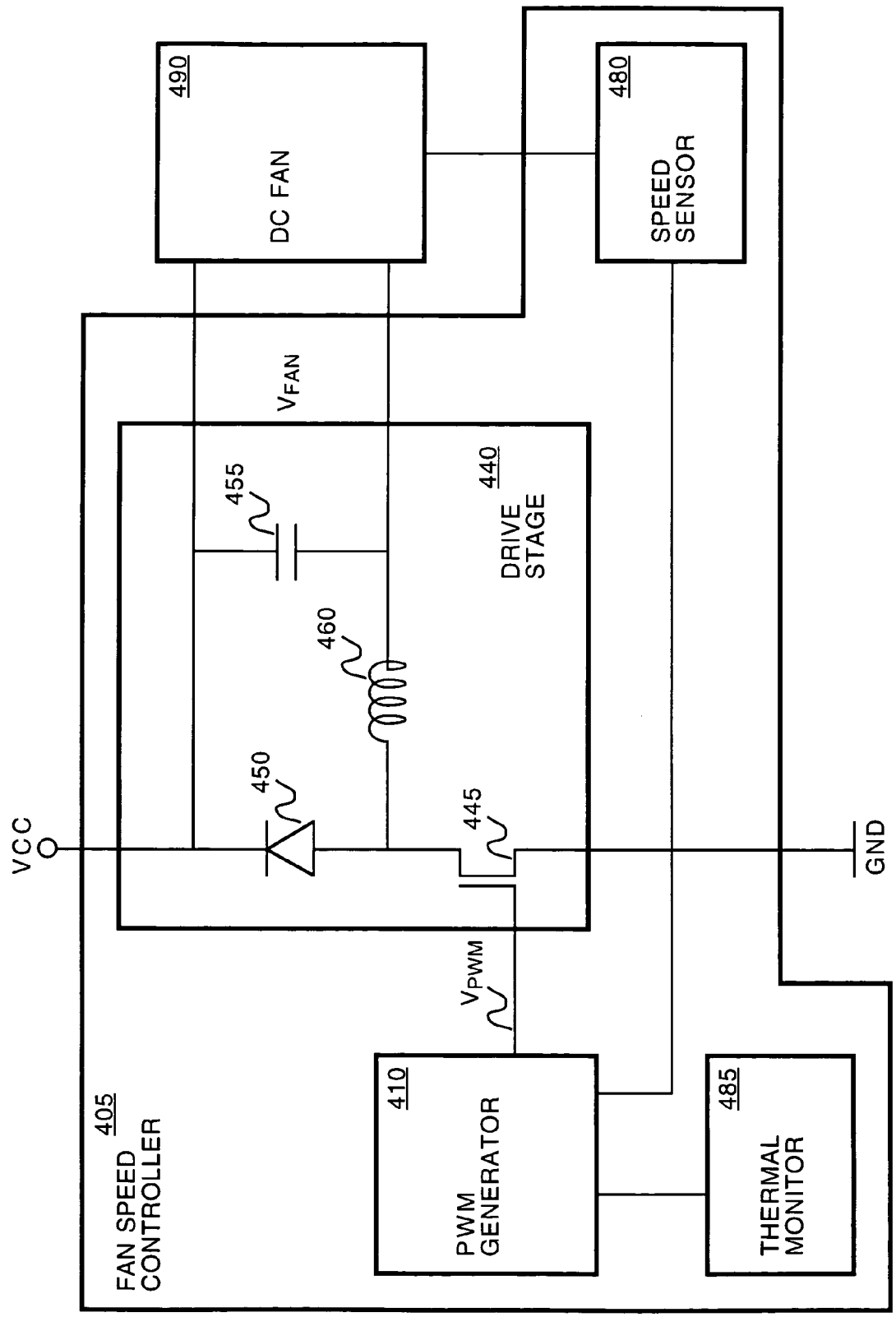
FIG. 4A shows a block diagram of a fan speed controller for controlling the operating speed of a fan, in accordance with one embodiment of the invention.

Referring now to FIG. 4A, a block diagram of a fan speed controller 405 for controlling a direct current (DC) fan 490, in accordance with one embodiment of the invention, is shown. As depicted in FIG. 4A, the fan speed controller 405 includes a pulse width modulation (PWM) generator 410 and a drive stage circuit 440. The fan speed controller 405 may further include a fan speed sensor (e.g., tachometer) 480, a thermal monitor (e.g., diode connected transistor) 485 or the like. The PWM generator 410 generates a PWM signal ($V_{PWM}$), e.g., a periodic rectangular wave, as a function of a feedback signal, e.g., a fan speed signal generated by the fan speed sensor 480 or a temperature signal generated by the thermal monitor 485. The duty cycle of the PWM signal ($V_{PWM}$) is modulated as a function of the feedback signal to control the operating speed of the fan 490.

The drive stage circuit 440 converts the supply voltage ($V_{CC}$) to a linear voltage ($V_{FAN}$). The voltage level of the linear voltage ($V_{FAN}$) is a function of the duty cycle of the PWM signal ($V_{PWM}$). In one embodiment, the drive stage 440 includes a transistor 445, a diode 450, a capacitor 455 and an inductor 460. The PWM signal ($V_{PWM}$) from the PWM generator 410 is received at the gate of the transistor 445. The source of the transistor 445 is electrically coupled to ground potential (GND). The drain of the transistor 445 is electrically coupled to the anode of the diode 450. The cathode of the diode 450 is electrically coupled to a supply potential ($V_{CC}$). A first terminal of the capacitor 455 is electrically coupled to the cathode of the diode 450 and the supply potential ($V_{CC}$). The second terminal of the capacitor 455 is electrically coupled to the first terminal of the inductor 460. The second terminal of the inductor 460 is electrically coupled to the anode of the diode 450 and the drain of the transistor 445. The linear voltage ($V_{FAN}$), for driving the DC fan 490, is generated across the capacitor 455.

During the duty cycle of the PWM signal ($V_{PWM}$) the transistor 445 is turned on. The diode 450 becomes reverse biased and the supply potential ($V_{CC}$) provides energy to the DC Fan 490 as well as the inductor 460. When the transistor 445 is turned off, the inductor current flows through the diode 450, transferring its stored energy to the DC fan 490. Hence, the diode 450 is utilized to provide a conductive path (e.g., current shunt) for stored inductive energy.

In an exemplary implementation, for a DC fan 490 that operates from a linear voltage ($V_{FAN}$) of approximately 6-12V and draws approximately 200 mA, the inductor 460 value and capacitor 455 value may be approximated as follows: At a linear voltage ($V_{FAN}$) of 6V, the duty cycle of the PWM signal should be approximately 50%. If circuit losses are assumed to be approximately 10%, than the duty cycle of the PWM signal ($V_{PWM}$) should be approximately 55%. In addition, the voltage across the diode 450 will be approximately 0V, assuming an ideal diode, when the transistor 445 is off. Thus, the voltage across the inductor ($V_L$) is given by Equation 1:

$$V_L = -V_{FAN} \quad (1)$$

The inductor ripple current should be small so that the inductor current is never zero. The drive stage 440 is operating in a continuous current mode when the inductor ripple current satisfies Equation 2:

$$I_{L.Ripple} \leq 2 \cdot I_{FAN} \quad (2)$$

The inductor current ($I_L$) and the inductor voltage ($V_L$) are given by Equation 3:

$$di_L/dt = V_L/L \quad (3)$$

Therefore, when the transistor 445 is off, Equation 3 can be approximate to given Equation 4:

$$\Delta I_L/\Delta T = |V_L|/L \quad (4)$$

where $\Delta T = 0.45 \cdot T$, $T = 1/f_{PWM}$, and $\Delta I_L = I_{L.Ripple}$. Herein, T is the switching period, $f_{PWM}$ is the switching frequency. By setting $\Delta I_L = I_{L.Ripple} = 2 \cdot I_{FAN}$, Equation 4 can be solved for the inductor value L, as shown in Equation 5:

$$L = (|V_L| \cdot \Delta T)/\Delta I_L = (|V_L| \cdot 0.45 \cdot T)/(2 \cdot I_{FAN}) = (0.225|V_L|)/(I_{FAN} \cdot f_{PWM}) \quad (5)$$

The voltage across the inductor, assuming a linear voltage ($V_{FAN}$) of 6V, is approximately 6V and the fan current is approximately 200 mA. If the switching frequency is 600 KHz, the inductor value is approximate 12 µH according to Equation 5. Changing the switching frequency will impact the inductor size. For example, the lower the frequency the higher the inductance value should be.

In one embodiment, the capacitor 455 value is selected based upon the ripple current through the inductor and the ripple voltage for the fan. The voltage across the capacitor 455 is given by Equation 6:

$$V_C = V_{FAN.DC} + V_{FAN.Ripple} \quad (6)$$

The ripple voltage across the fan can be estimated according to Equation 7.

$$V_{FAN.Ripple} = I_{C.Ripple} \cdot [ESR_C + 1/(4 \cdot f_{PWM} \cdot C)] \quad (7)$$

Assuming that the ripple current flows through the capacitor and not the fan, the ripple current through the inductor will be equal to the ripple current through the capacitor. Thus, the equivalent series resistance (ESR) value of the capacitor can be solved for according to Equation 8.

$$ESR_C \leq (0.1 \cdot V_{FAN})/(2 \cdot I_{FAN}) \quad (8)$$

In one embodiment, a small ceramic capacitor of approximately 1 µF, 0805, 16V, X5R may be selected to provide the $ESR_C$ value of less than 1.5 Ohm.

Figure 4B:
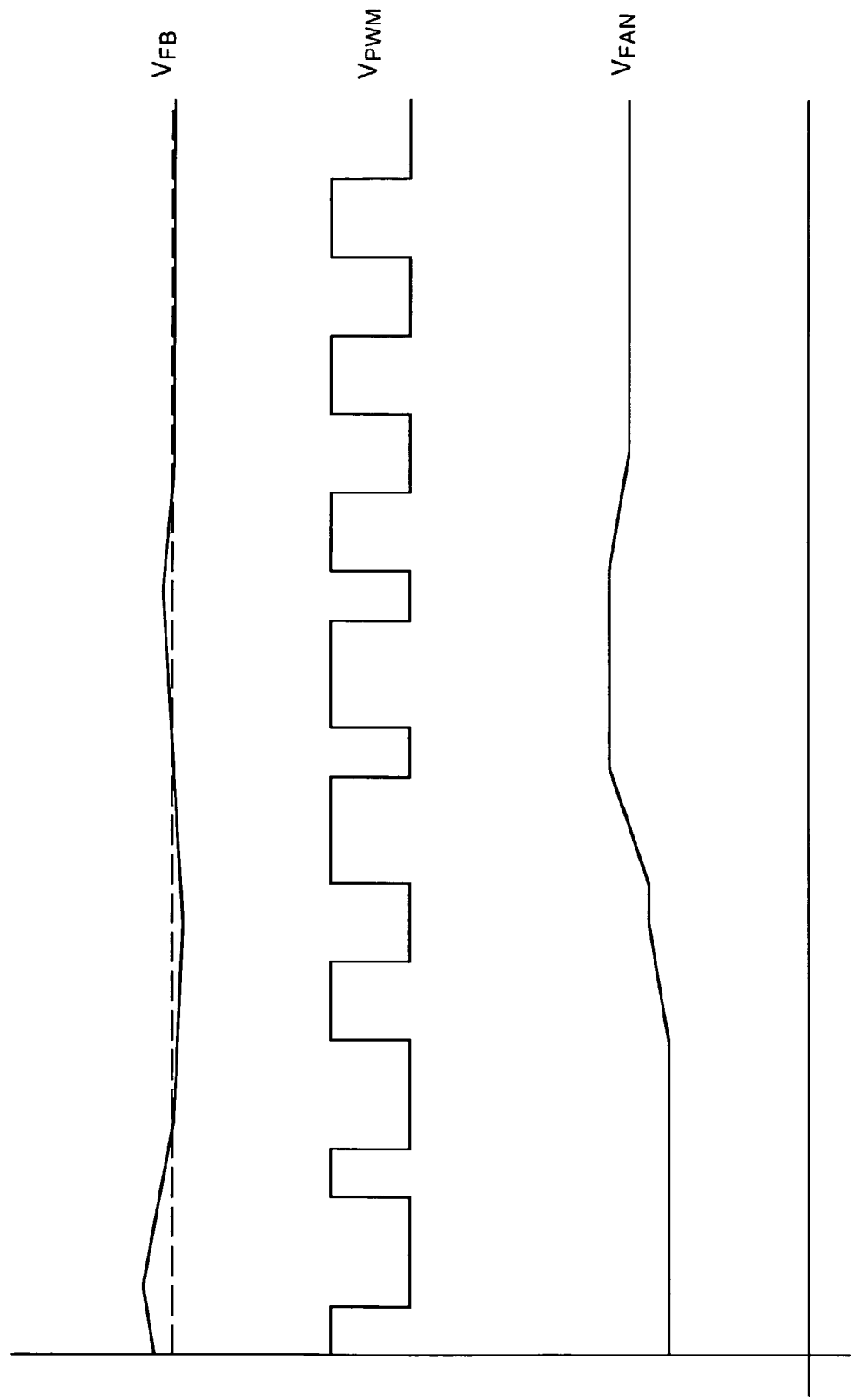
FIG. 4B shows a timing diagram illustrating the operation of the fan speed controller, in accordance with one embodiment of the present invention.

Referring now to FIG. 4B, a timing diagram illustrating the operation of the fan speed controller 405, in accordance with one embodiment of the present invention, is shown. As depicted in FIG. 4B, an exemplary relationship between the feedback signal ($V_{FB}$), the PWM signal ($V_{PWM}$) and the linear voltage ($V_{FAN}$) is illustrated. For example, as the operating speed of the fan, as represented by the solid line ($V_{FB}$), fluctuates about a desired operating speed, as represented by the dashed line, the duty cycle of the PWM signal ($V_{PWM}$) increases and decreases accordingly. The linear voltage ($V_{FAN}$) for driving the fan increases or decreases according to increases and decreases in the duty cycle of the PWM signal ($V_{PWM}$). As a result, the operating speed of the fan may be maintain at a desired speed.

Figure 5:
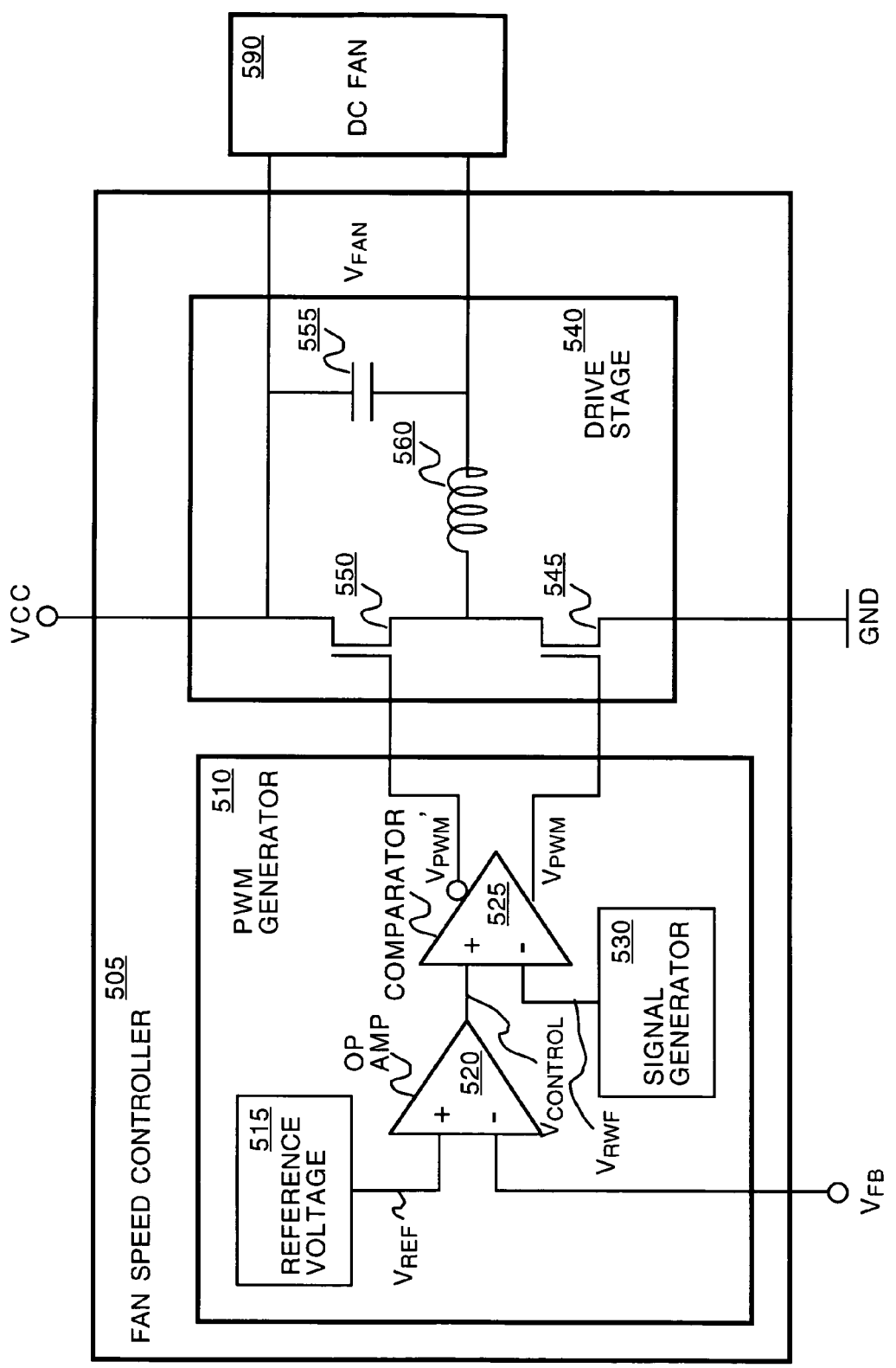
FIG. 5 shows a block diagram of a fan speed controller for controlling the operating speed of a fan, in accordance with another embodiment of the invention.

Referring now to FIG. 5, a block diagram of a fan speed controller 505 for controlling a direct current (DC) fan 590, in accordance with another embodiment of the invention, is shown. As depicted in FIG. 5, the fan speed controller 505 includes a pulse width modulation (PWM) generator 510 and a drive stage circuit 540.

The PWM generator 510 generates a PWM signal ($V_{PWM}$) as a function of a feedback signal ($V_{FB}$). The PWM generator 510 includes a reference voltage generator 515, an operational amplifier 520, a comparator 525 and a signal generator 530. The operational amplifier 520 receives a feedback signal ($V_{FB}$) (e.g., speed, temperature or the like) and the reference voltage ($V_{REF}$) generated by the reference voltage generator 515. The operational amplifier 520 generates a control signal ($V_{CONTROL}$) having a voltage that is a function of the difference between the feedback signal ($V_{FB}$) and the reference voltage ($V_{REF}$). The signal generator 530 generates a signal having a repetitive wave form ($V_{RWF}$) (e.g., sawtooth or the like). The comparator 525 receives the control signal ($V_{CONTROL}$) and the repetitive wave form signal ($V_{RWF}$). The comparator 525 generates the PWM signal ($V_{PWM}$) as a function of the relative difference between the control signal ($V_{CONTROL}$) and the repetitive wave form signal ($V_{RWF}$). The comparator 525 also generates a complement of the PWM signal ($V_{PWM}'$). Alternatively, the complement of the PWM signal ($V_{PWM}'$) may be generated by a separate inverter (not shown).

The drive stage 540 converts (e.g., switch mode) the supply voltage ($V_{CC}$) to a linear voltage ($V_{FAN}$). The voltage level of the linear voltage ($V_{FAN}$) is a function of the duty cycle of the PWM signal ($V_{PWM}$). In one embodiment, the drive stage 540 includes a first transistor 545, a second transistor 550, a capacitor 555 and an inductor 560. The PWM signal ($V_{PWM}$) from the PWM generator 510 is received at the gate of the first transistor 545. The source of the first transistor 545 is electrically coupled to a ground potential (GND). The drain of the first transistor 545 is electrically coupled to the source of the second transistor 550. The gate of the second transistor 550 receives the compliment of the PWM signal ($V_{PWM}'$). The drain of the second transistor 550 is electrically coupled to a supply potential ($V_{CC}$). A first terminal of the capacitor 555 is electrically coupled to the drain of the second transistor 550 and the supply potential ($V_{CC}$). The second terminal of the capacitor 555 is electrically coupled to the first terminal of the inductor 560. The second terminal of the inductor 560 is electrically coupled to the source of the second transistor 550 and the drain of the first transistor 545. The linear voltage ($V_{FAN}$), for driving the DC fan 590, is generated across the capacitor 555.

During the duty cycle of the PWM signal ($V_{PWM}$), the first transistor 545 is turned on and the second transistor 550 is turned off. The supply potential ($V_{CC}$) provides energy to the DC Fan 590 as well as the inductor 560. When the PWM signal ($V_{PWM}$) is low, the first transistor 545 is turned off and the second transistor 550 is turned on. The inductor 560 current, therefore, flows through the second transistor 550, transferring its stored energy to the DC fan 590. Hence, the second transistor 550 is utilized to provide a conductive path (e.g., current shunt) for stored inductive energy.

In an exemplary implementation, the operating frequency ($f_{PWM}$) of the PWM signal ($V_{PWM}$) is approximately 200-1,000 KHz. The inductor 560 is approximately 1-500 µH and the capacitor 555 is approximately 0.1-50 µF. The linear voltage ($V_{FAN}$) has a voltage range of between one half the maximum operating fan voltage (e.g., 2.5-25V) up to the maximum operating fan voltage (5-50V), in one embodiment.

Accordingly, embodiments of the present invention provide an improved fan speed controller. The improved speed controller readily reduces switching noise as compared to conventional PWM based fan speed controllers. The improved speed controller readily provides efficiencies (e.g., input power divided by power delivered to the fan) of 80-90%. The fan speed controller, in accordance with embodiments of the present invention, may be utilized to control the operating speed of electronic device cooling fans. Exemplary electronic devices include, but are not limited to, computers, servers, game consoles, microprocessors, graphics processors and the like.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A fan speed controller comprising:
    a pulse width modulation generator for generating a pulse width modulation signal, said pulse width modulation generator further for generating a complement of said pulse width modulation signal, wherein an operating frequency of said pulse width modulation generator is approximately within the range of 200-1,000 KHz; and
    a drive stage circuit coupled to said pulse width modulation generator and for switch mode converting a supply voltage into a linear voltage for driving a fan, wherein a voltage level of said linear voltage is a function of said pulse width modulation signal, and wherein said drive stage circuit is further for switch mode converting said supply voltage into said linear voltage in accordance with said pulse width modulation signal and said complement of said pulse width modulation signal.

2. The fan speed controller according to claim 1, wherein an operating speed of said fan is a function of said voltage level of said linear voltage.

3. The fan speed controller according to claim 1, further comprising a thermal monitor having an output coupled to an input of said pulse width modulation generator.

4. The fan speed controller according to claim 1, further comprising a speed sensor having an input coupled to an output of said fan and an output coupled to an input of said pulse width modulation generator.

5. The fan speed controller according to claim 1, wherein said drive stage circuit comprises:
    a first transistor having a gate for receiving said pulse width modulation signal and a source coupled to a first potential;
    a current shunting element having a first terminal coupled to a drain of said first transistor and a second terminal coupled to a second potential;
    a capacitor having a first terminal coupled to said second terminal of said current shunting element; and
    an inductor having a first terminal coupled to a second terminal of said capacitor and a second terminal coupled to said first terminal of said current shunting element and to said drain of said first transistor.

6. The fan speed controller according to claim 5, wherein:
    said inductor is approximately within the range of 1-500 µH; and
    said capacitor has an ESR value determined as a function of said first and second potentials.

7. The fan speed controller according to claim 6, wherein a difference between said second potential and said first potential is approximately within the range of 5-50 Volts.

8. A fan speed controller comprising:
    a pulse width modulation generator for generating a pulse width modulation signal, said pulse width modulation generator further for generating a complement of said pulse width modulation signal, wherein an operating frequency of said pulse width modulation generator is approximately within the range of 200-1,000 KHz; and
    a drive stage circuit coupled to said pulse width modulation generator and for switch mode converting a supply voltage into a linear voltage for driving a fan, wherein said drive stage circuit is further for switch mode converting said supply voltage into said linear voltage in accordance with said pulse width modulation signal and said complement of said pulse width modulation signal, and wherein said drive stage circuit further comprises:
        a first transistor having a gate for receiving said pulse width modulation signal and a source coupled to a first potential;
        a current shunting element having a first terminal coupled to a drain of said first transistor and a second terminal coupled to a second potential;
        a capacitor having a first terminal coupled to said second terminal of said current shunting element; and
        an inductor having a first terminal coupled to a second terminal of said capacitor and a second terminal coupled to said first terminal of said current shunting element and to said drain of said first transistor.

9. The fan speed controller according to claim 8, wherein said current shunting element comprises a diode having an anode coupled to said drain of said first transistor and to said second terminal of said inductor, and a cathode coupled to said second potential and to said first terminal of said capacitor.

10. The fan speed controller according to claim 8, wherein said current shunting element comprises a second transistor having a gate for receiving a complement of said pulse width modulation signal, a source coupled to said drain of said first transistor and to said second terminal of said inductor, and a drain coupled to said second potential and to said first terminal of said capacitor.

11. The fan speed controller according to claim 8, further comprising a thermal monitor having an output coupled to an input of said pulse width modulation generator.

12. The fan speed controller according to claim 8, further comprising a fan coupled across said capacitor.

13. The fan speed controller according to claim 12, further comprising a speed sensor having an input coupled to an output of said fan and an output coupled to an input of said pulse width modulation generator.

14. The fan speed controller according to claim 8, wherein said pulse width modulation signal is generated as a function of a feedback signal.

15. The fan speed controller according to claim 14, wherein said feedback signal is generated by a thermal monitor.

16. The fan speed controller according to claim 14, wherein said feedback signal is generated by a speed sensor.

17. The fan speed controller according to claim 8, wherein a linear voltage for driving a fan is generated across said capacitor.

18. The fan speed controller according to claim 8, wherein said inductor is approximately within the range of 1-500 µH.

19. The fan speed controller according to claim 18, wherein said capacitor is approximately within the range of 0.1-50 uF.

20. The fan speed controller according to claim 18, wherein said capacitor has an ESR value determined as a function of said first and second potentials.

21. The fan speed controller according to claim 8, wherein a difference between said second potential and said first potential is approximately within the range of 5-50 Volts.

22. A method of controlling the speed of a fan, said method comprising:
   generating a pulse width modulated signal, wherein said pulse width modulated signal is approximately within the range of 200-1,000 KHz;
   generating a complement of said pulse width modulated signal; and
   switch mode converting a supply voltage into a linear voltage for driving a fan, wherein a voltage level of said linear voltage is a function of said pulse width modulated signal, wherein said switch mode converting further comprises switch mode converting said supply voltage into said linear voltage in accordance with said pulse width modulated signal and said complement of said pulse width modulated signal.

23. The method according to claim 22, wherein an operating speed of said fan is a function of said voltage level of said linear voltage.

24. The method according to claim 23, wherein said generating a pulse width modulated signal comprises generating said pulse width modulation signal as a function of a temperature signal.

25. The method according to claim 23, wherein said generating a pulse width modulated signal comprises generating said pulse width modulation signal as a function of a fan speed signal.

* * * * *